United States Patent

Schmermund

[11] 4,005,619
[45] Feb. 1, 1977

[54] STEPLESSLY SETTABLE ELLIPTICAL GEARING

[76] Inventor: Alfred Schmermund, 62, Kornerstrasse, 5820 Gevelsberg, Germany

[22] Filed: Oct. 15, 1975

[21] Appl. No.: 622,793

[30] Foreign Application Priority Data

Oct. 19, 1974 Germany .......................... 2449773

[52] U.S. Cl. .............................................. 74/804
[51] Int. Cl.² ......................................... F16H 1/28
[58] Field of Search ............................. 74/804, 805

[56] References Cited

UNITED STATES PATENTS

| | | | |
|---|---|---|---|
| 1,144,092 | 6/1915 | Apple | 74/804 |
| 2,481,627 | 9/1949 | Sharpe | 74/804 |
| 2,948,165 | 8/1960 | Luthi | 74/804 |
| 3,208,293 | 9/1965 | Boehm | 74/804 X |
| 3,216,405 | 11/1965 | Jungbluth | 74/804 |

*Primary Examiner*—Samuel Scott
*Assistant Examiner*—Lance W. Chandler
*Attorney, Agent, or Firm*—Sughrue, Rothwell, Mion, Zinn & Macpeak

[57] ABSTRACT

A steplessly settable gear box provided with a slidable head coupled to an output shaft is disclosed. The slidable head is slidably mounted on a first spur gear coupled to an input shaft and in mesh with an internally toothed fixed annular gear. A second spur gear is in mesh with an internally toothed angularly settable annular gear and the head is so coupled to the second spur gear as to be slidably deplaceable relative to the axis of rotation of the first spur gear in dependence on the angular setting of the last mentioned annular gear.

10 Claims, 5 Drawing Figures

STEPLESSLY SETTABLE ELLIPTICAL GEARING

BACKGROUND OF THE INVENTION

The present invention relates to a gear box comprising elliptical gearing according to the Cardan circle system with a spur wheel rollable along an internally toothed annular gear.

Such gears serve to translate the constant angular speed of a rotating driving or input shaft into a periodically variable angular speed of a driven or output shaft.

For this, a Cardan crank or elliptical spur wheels or an anti-parallel crank may be employed. However, all these gearings have the property of generating a constantly equal period in respect of the angular speed, i.e. the same ellipse is repeatedly transversed. Although the shape of the ellipse may be altered so that one obtains other speed relationships, however for example in the case of a Cardan circle pair, the point on the rolling circle spur wheel describing the ellipse must be altered, i.e. redisposed for this purpose in that this point is moved radially outwardly or inwardly. For this, the gearing must be stopped and manually reset. This resetting can thus be undertaken only at standstill and may be difficult to accomplish.

SUMMARY OF THE INVENTION

According to one aspect of the present invention there is provided a gear box comprising a housing, an input shaft extending into the housing, an output shaft extending into the housing, a first internally toothed annular gear fixedly secured to the housing, a first spur gear coupled to the input shaft and disposed within the first internally toothed annular gear to rollably engage the teeth thereof, a second internally toothed annular gear supported by the housing to be angularly settable with respect thereto, a second spur gear disposed within the second internally toothed annular gear to rollably engage the teeth thereof, and a sliding head element disposed within the housing and slidably supported on the first spur gear, the head element being coupled to the output shaft and being steplessly displaceable relative thereto through the second spur gear in dependence upon the setting of the second internally toothed annular gear.

According to another aspect of the invention there is provided a gear box comprising a housing, an input shaft extending into the housing, an output shaft extending into the housing, a first internally toothed annular gear fixedly secured to the housing, a first spur gear coupled to the input shaft and disposed within the first internally toothed annular gear to rollably engage the teeth thereof, a second internally toothed annular gear supported by the housing to be angularly settable with respect thereto; a second spur gear disposed within the second internally toothed annular gear to rollably engage the teeth thereof, and a sliding head element disposed within housing and slidably supported by guide means provided on the first spur gear, the head element being coupled to the output shaft and being steplessly displaceable along the guide means relative the axis of rotation of the first spur gear through the second spur gear in dependence upon the setting of the second internally toothed annular gear.

It is expedient, when the sliding head carries a toothed rack, while the second spur gear is disposed on a prolongation of a pinion, which is in engagement with the toothed rack, in order in this manner to be able to displace the slidable head element. The sliding head in particular is provided with a roller which co-operates with a guide track provided on a member which is connected to the driven output shaft, so that the radial distance between the roller of the sliding head and the axis of rotation of the first spur gear may be adjusted by resetting the sliding head element.

The driven output shaft is normally disposed co-axially with the main axis of the gearing, it may however be disposed eccentrically thereto to enable a distortion of the elliptical angular output speed to be obtained when desired.

Furthermore, the second internally toothed annular gear may be adjusted by means of a spindle, such as a worm spindle provided with a self-locking thread.

BRIEF DESCRIPTION OF THE DRAWINGS

An embodiment at the invention will now be more particularly described by way of example with reference to the accompanying drawings, in which.

DESCRIPTION OF THE PREFERRED EMBODIMENT

Figure 1:
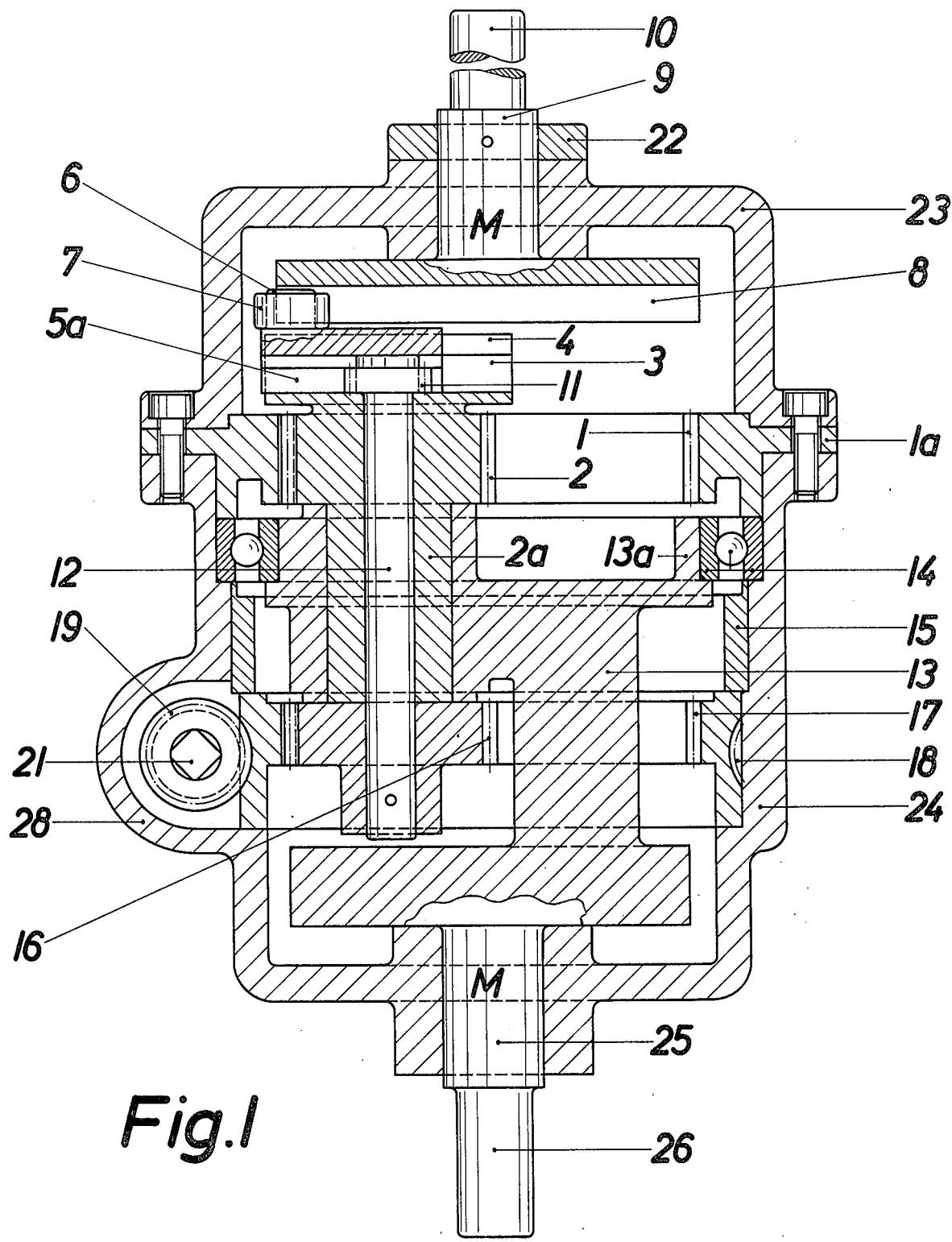
FIG. 1 shows an elliptical gearing in section.

Referring now to the accompanying drawings, the gear box shown in FIG. 1 comprises a Cardan circle pair consisting of a locally fixed internally toothed annular gear 1 and a spur gear 2, which rolls along the internally toothed periphery of the annular gear 1 and which possesses a pitch circle diameter, which is half as great as that of the internally toothed annular gear 1. The internally toothed annular gear 1 is for example screwed fast to a flange 1a, disposed at the internal spur gear and extending outwardly, between two housing parts 23 and 24, in which the gearing is accommodated.

Figure 2:
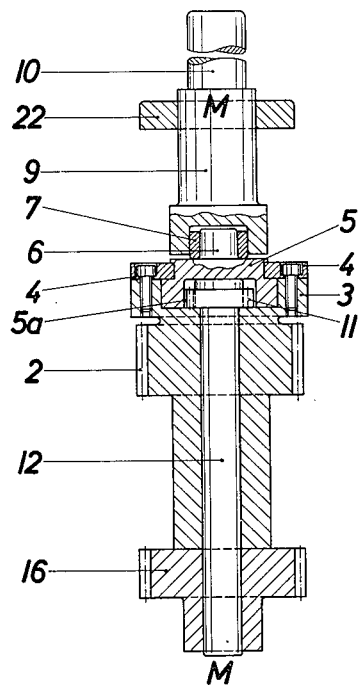
FIG. 2 shows the resetting device for the gearing of FIG. 1 in side elevation.
Figure 3:
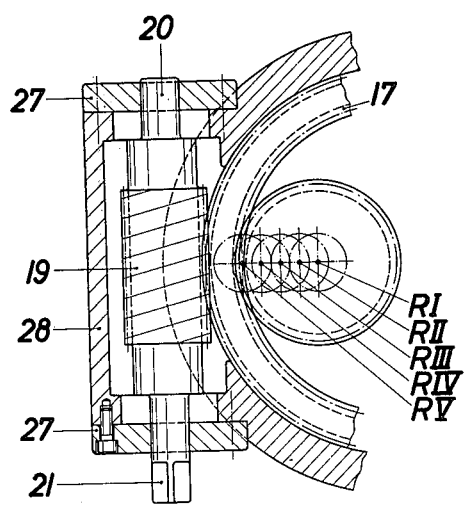
FIG. 3 shows a part of the resetting device of FIG. 2 in plan view.
Figure 4:
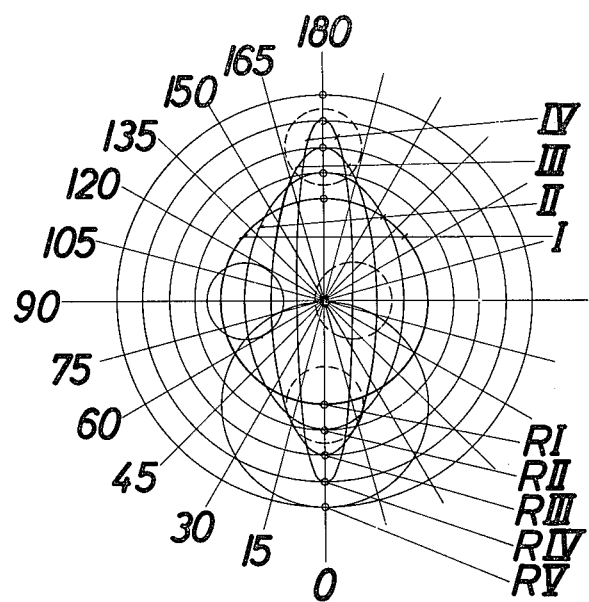
FIG. 4 shows the Cardan circle pair with a series of example of adjustment.

The spur gear 2 carries a head casing 3 provided with cover strips 4. As shown in FIG. 2, the casing 3 is integral with the gear 2. Disposed in the head casing 3 is a slidable head element 5, which displays an upwardly extending stub 6, on which a roller 7 is rotatably mounted. The slidable head 5 is equipped internally at one side with a toothed rack 5a, which is in engagement with a pinion 11. The pinion 11 is disposed on a setting spindle 12, which is rotatably journalled in the spur gear 2 and a bearing sleeve 2a arranged thereunder. By rotating the setting spindle 12, the head 5 with the roller 7 through the pinion 11 and the toothed rack 5a can traverse the positions $R_I - R_{II} - R_{IV} - R_V$, which are illustrated in FIG. 4. Thus, in response to the rotation of the spindle 12 the slidable head element 5 is steplessly slidably along guide means provided on the spur gear 2.

A driven output shaft which is provided with components 9 and 10, extends through the upper housing part 23, while the shaft 9 at its lower end is connected with a member provided with a guide track 8 of U-shaped cross-section, in which the roller 7 engages to drive the output shaft 9. Thus the member provided with the guide track 8 is set into rotation by interaction with the roller 7, which corresponds to the elliptical path I — II — III — IV — V or resultant mean values, whereby an increasing or decreasing angular speed of the driven output shaft 9, 10 is produced.

An upper retaining ring 22 is provided on the shaft 9 externally of the housing 23 to restrain the member provided with the guide channel 8 from falling under gravity.

The setting spindle 12, which is rotatable journalled in the spur gear 2 and in the bearing sleeve 2a, which are integrally formed with the head casing 3 provided with cover strips 4 screwed thereto, at its lower end displays a setting spindle spur gear 16, which is exactly the same diameter as the spur gear 2. The spur gear 16 is rollable along in an internally toothed annular gear 17, which is provided with external worm wheel gearing 18 and which bears against a shoulder in the lower housing part 24 and against a spacer tube 15, which is provided to facilitate the incorporation of the internally toothed annular gear 17. Arranged in a part 28 of the lower housing part 24 is a worm 19, which by its ends 20 and 21 is journalled in bearings 27, while the end 21 is formed as quadrilateral and serves for the connection with a setting member. A hand wheel, but also a motor, a hydraulic, pneumatic, electromagnetic or magnetic device can for example be employed as setting member. It is in this case expedient, if the worm is formed to be self-locking to avoid an unwanted resetting.

When the worm 19 is not actuated, the Cardan circle pair 1 and 2 is supported by the second circle pair 16 and 17.

The driving or input shaft 25 and 26 is introduced into the lower housing part 24 from below and is integrally connected with the parts 13 and 13a, which receive the bearing sleeve 2a and thus effect the rolling along of the spur gear 2 and 16. The part 13a is rotatably journalled in the lower housing part 24, for example by means of grooved ball bearing 14, while the driving shaft part 25 is likewise rotatably journalled in the lower housing part 24. Hereby, an absolutely secure bearing is attained. The centres of rotation of driving and driven shaft are designated by M, driving and driven shafts here being arranged co-axially with one another. FIG. 4 shows the curves, which belong to the individual positions R of the roller 7 and which range from an infinitely small ellipse (=line) up to a circularly shaped ellipse (=circle). The adjustment therebetween can ensue from outside by means of the setting worm 19 also during running and even under load, since no kind of obstacle is present. Since guided motion is present, each range and each position can be found again and adjusted again most accurately by means of scales or the like.

Figure 5:
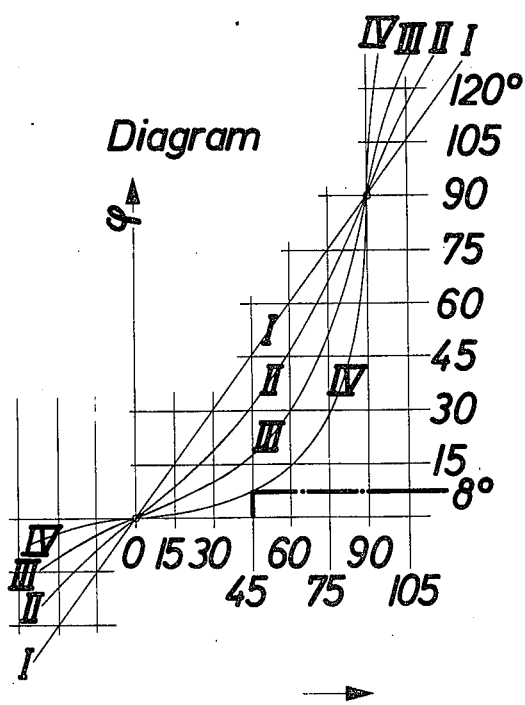
FIG. 5 shows a diagram representing the relationship between the driving and driven angles in FIG. 4.

FIG. 5 shows the angular speed diagram, in which the driven angle $\psi$ is shown against the driving angle $\phi$ for the individual position $R_I _ V$ of the roller 7 and from which the actually attainable relationships are exactly evident and calculable.

Especially when the driven shaft 9 is arranged parallel to the main axis 25 of the gearing, it is expedient to so mount the driven shaft 9 that it may be selectably displaceable in a direction radial to the main axis, which is coincident with the axis of the input shaft 25. Alternatively, the resetting of the sliding head may be carried out by displacement means, which comprises a spindle extended into the sliding head housing 3, a nut on the sliding head 5 and a pair of bevel gears provided on the spindle.

In this case, the setting spindle — such as the spindle 12 — is coupled to the second spur gear 16 in the manner shown in FIGS. 1 and 2, but the rack and pinion coupling between such spindle and the slidable head element is replaced by any suitable coupling such as a nut co-operating with two bevel gears provided on the spindle.

I claim:

1. A gear box comprising in combination:
   a housing;
   an input shaft extending into said housing;
   an output shaft extending into said housing;
   a first internally toothed annular gear fixedly secured to said housing;
   a first spur gear coupled to said input shaft and disposed within said first internally toothed annular gear to rollably engage the teeth thereof;
   a second internally toothed annular gear supported by said housing to be angularly settable with respect thereto;
   a second spur gear disposed within said second internally toothed annular gear to rollably engage the teeth thereof; and
   a sliding head element disposed within said housing and slidably supported on said first spur gear, said head element being coupled to said output shaft and being steplessly displaceable relative thereto through said second spur gear in dependence upon the angular setting of said second internally toothed annular gear.

2. A gear box as defined in claim 1, wherein the pitch circle diameter of said first annular gear is twice that of said first spur gear.

3. A gear box as defined in claim 1, wherein said head is provided with a toothed rack engaging a pinion coupled to said second spur gear.

4. A gear box as defined in claim 1, wherein said head is provided with a roller engaging a track on a member carried by said output shaft to rotate therewith.

5. A gear box as defined in claim 1, wherein said output shaft is disposed eccentrically with respect to the axis of said input shaft.

6. A gear box as defined in claim 1, wherein said second annular gear is angularly settable by an adjuster spindle.

7. A gear box as defined in claim 6, wherein said adjuster spindle comprises a worm spindle co-operating with a worm gear provided on said second annular gear.

8. A gear box as defined in claim 6, wherein said adjuster spindle is provided with a self-locking thread.

9. A gear box as defined in claim 1, wherein said output shaft is so mounted as to be selectably displaceable radially relative to the axis of said input shaft.

10. A gear box as defined in claim 1, wherein said head is mounted to be slidably displaceable in a casing provided on said first spur gear, said head being selectably displaceably by displacement means comprising a spindle extending into said casing, a nut on said head, and a pair of bevel gears mounted on said spindle.

* * * * *